United States Patent [19]

Umeda et al.

[11] Patent Number: 5,278,217
[45] Date of Patent: Jan. 11, 1994

[54] WATER ABSORPTIVE COMPOSITION

[75] Inventors: Masanari Umeda; Yukio Sakuraba, both of Kasugai; Fumihiro Ashiya, Mito; Toshinobu Matsuo, Yokohama, all of Japan

[73] Assignees: Tokai Rubber Industries, Ltd.; Summitomo Electric Industries, Ltd.; Nippon Telegraph and Telephone Corp., Japan

[21] Appl. No.: 957,482

[22] Filed: Oct. 7, 1992

Related U.S. Application Data

[62] Division of Ser. No. 729,726, Jul. 15, 1991, Pat. No. 5,179,611.

[30] Foreign Application Priority Data

| Jul. 17, 1990 | [JP] | Japan | 2-191588 |
| Jul. 17, 1990 | [JP] | Japan | 2-191589 |
| Jul. 17, 1990 | [JP] | Japan | 2-191590 |
| Jul. 17, 1990 | [JP] | Japan | 2-191591 |
| Jul. 17, 1990 | [JP] | Japan | 2-191592 |
| Jul. 17, 1990 | [JP] | Japan | 2-191593 |

[51] Int. Cl.$^5$ .............. C08K 5/09; C08K 5/05; C08L 5/00; C08L 3/00
[52] U.S. Cl. ............. 524/394; 524/56; 524/47; 524/379; 524/503; 524/504; 524/505; 524/506; 524/522; 524/525; 428/407
[58] Field of Search .......... 524/503, 504, 505, 506, 524/522, 525, 56, 47, 394, 379; 428/407

[56] References Cited

U.S. PATENT DOCUMENTS

| 4,382,999 | 5/1983 | Harima et al. | 428/492 |
| 4,420,588 | 12/1983 | Yoshioka et al. | 525/93 |
| 4,590,227 | 5/1986 | Nakamura et al. | 524/43 |
| 4,701,015 | 10/1987 | Saito et al. | 385/109 |
| 4,709,984 | 12/1987 | Oestreich et al. | 385/109 |
| 4,802,732 | 2/1989 | Fukuma et al. | 385/114 |
| 4,944,570 | 7/1990 | Oglesby et al. | 385/109 |
| 4,983,013 | 1/1991 | Dotzer et al. | 385/110 X |
| 4,997,257 | 3/1991 | Spedding | 385/110 X |
| 5,026,780 | 6/1991 | Takizawa et al. | 525/301 |
| 5,075,373 | 12/1991 | Takemori et al. | 525/57 |
| 5,082,380 | 1/1992 | Sutehall et al. | 385/110 X |
| 5,087,110 | 2/1992 | Inagaki et al. | 385/110 |

FOREIGN PATENT DOCUMENTS 62-188109  8/1987  Japan .............. 385/100 X

Primary Examiner—Paul R. Michl
Assistant Examiner—Peter Szekely
Attorney, Agent, or Firm—Parkhurst, Wendel & Rossi

[57] ABSTRACT

A water absorptive composition comprising a thermoplastic elastomer as a first component, a water-absorptive resin as a second component, and a third component selected from the group which consists of: a water-soluble resin; a hydrophilic compound selected from the group consisting of metal salt of carboxylic acid, polyhydric alcohol, amino alcohol, linear polyether, saccharide, and sugar alcohol; and a surface treating agent selected from the group consisting of sorbitan fatty acid ester, glycidyl ether of polyhydric alcohol, and silane coupling agent. The composition is suitably used for producing a water absorptive member for protecting optical fiber elements of an optical fiber cable.

15 Claims, 3 Drawing Sheets

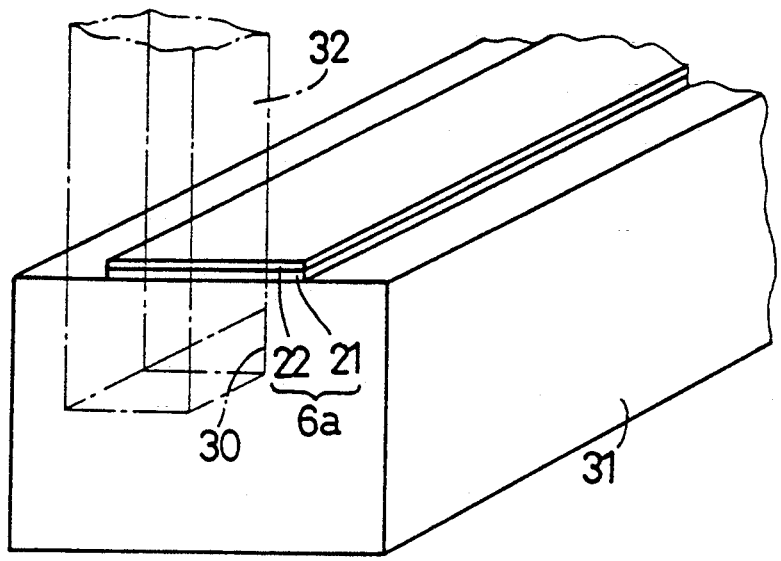
FIG. 5
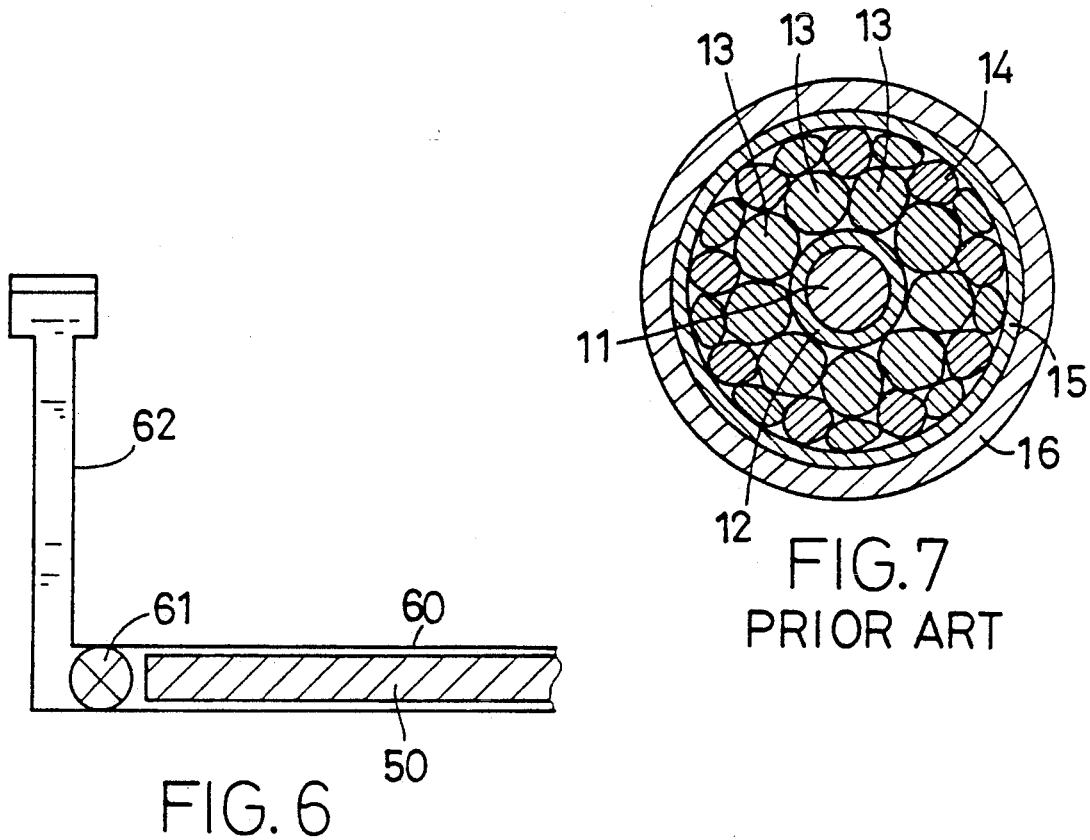
FIG. 6
FIG. 7
PRIOR ART

WATER ABSORPTIVE COMPOSITION

This is a Rule 60 divisional application Ser. No. 07/729,726 filed Jul. 15, 1991, now U.S. Pat. No. 5,179,611.

BACKGROUND OF THE INVENTION

1. Field of the Invention

The present invention relates in general to a water absorptive composition, and more particularly to an optical fiber cable using a water absorptive member formed by using such a water absorptive composition.

2. Discussion of the Prior Art

There are known water-proofed optical fiber cables, which are classified into two types, depending upon the manner in which optical fiber elements are waterproofed. One of the two types uses a water-proofing compound jelly which fills gaps between a plurality of optical fibers and a non-woven fabric disposed around a bundle of the optical fibers. The optical fibers are arranged around the circumference of a central tension member, and the non-woven fabric is covered by a cable jacket which provides an outer surface of the cable. This type of water-proofed optical fiber cable exhibits excellent water-proofing property, but suffers from low production efficiency and difficulty in handling for connection to another cable. Namely, the compound jelly for water-proofing the optical fibers is usually sticky and tacky, and requires an organic solvent for removal thereof.

The other type of the known water-proofed optical fiber cable is shown in FIG. 7. In this type of cable, a central tension member 11 is covered by a water absorptive layer 12, and a plurality of optical fibers 13 are arranged around the circumference of the water absorptive layer 12. Around the circular array of the optical fibers 13, there is disposed an array of water absorptive spun yarns 14 such that each spun yarn 14 extends parallel to the optical fibers. The array of the spun yarns 14 is wrapped and covered by an outer water absorptive layer 15 made of acrylic water absorptive fibers. The outer water absorptive layer 15 is covered by a cable jacket 16, which is the outermost layer of the cable. This type of water-proofed optical fiber cable is disclosed in laid-open publication No. 62-188109 of unexamined Japanese Patent Application.

However, the water absorptive layer 15 made of a water absorptive acrylic fiber does not have sufficiently high hygroscopic swelling ratio and speed. Therefore, where such a water absorptive layer is used for waterproofing an optical fiber cable of a type having fiber accommodating grooves as shown in FIGS. 8 and 9, additional water absorptive tapes are required. More specifically, the conventional optical fiber cable of FIGS. 8 and 9 has an elongated grooved member 2 in which a tension member 1 is embedded in alignment with the axis of the cable. The grooved member 2 has four grooves 3 formed in the outer surface, so as to extend in the longitudinal or axial direction of the cable, such that the grooves are spaced from each other in the circumferential direction of the grooved member 2. Each groove 3 accommodates a plurality of optical fiber tapes 4, and a water absorptive tape 5, which are superposed on each other to form a stack. The grooved member 2 is covered by a water absorptive layer 6, which in turn is covered by an outermost cable jacket 7. The water absorptive layer 6 made of an acrylic fiber is effective to secure water-proofing between the grooved member 2 and the cable jacket 7. However, since the hygroscopic swelling ratio and speed of the water absorptive layer 6 are not sufficiently high, the layer 6 is not sufficiently capable of protecting the interior of the grooves 3 from exposure to water or aqueous components, whereby the optical fiber tapes 4 may be exposed to water in the grooves 3. To solve this problem, the water absorptive tape 5 having the same width (1.5-3.0 mm) as the optical fiber tapes 4 is provided for each stack of the tapes 4 in each groove 3, so that the water absorptive tape 5 absorbs water in the groove 3 and hygroscopically swells between the adjacent tapes 4, to thereby protect the tapes 4 from exposure to the water. However, the insertion of the water absorptive tape 5 in each stack of the optical fiber tapes 4 in each groove 3 is considerably cumbersome and time-consuming, resulting in lowering the production efficiency of the optical fiber cable.

In recent years, the water-proofed optical fiber cables are widely used in various fields, for example, as submarine cables. Where the optical fiber cable using only a water absorptive layer as indicated at 6 in FIGS. 8 and 9 is used as a submarine cable, crazing or deterioration of the cable jacket 7 causes entry of the sea water (containing metal salt) into the grooves 3, which may result in the sea water to run in the grooves over a distance as long as several tens of meters, due to insufficient hygroscopic swelling ratio and speed of the acrylic fiber layer 6 with respect to the sea water.

SUMMARY OF THE INVENTION

It is therefore a first object of the present invention to provide a water absorptive composition which exhibits excellent water-absorbing or -proofing properties or sufficiently high hygroscopic swelling ratio and speed.

A second object of the invention is to provide an optical fiber cable which is simple in construction and economical to manufacture, and which exhibits excellent water-absorbing or -proofing properties, even with respect to sea water.

The above first object may be achieved according to one aspect of the present invention, which provides a water absorptive composition comprising a thermoplastic elastomer as a first component, a water-absorptive resin as a second component, and a third component selected from the group consisting of: a water-soluble resin; a hydrophilic compound selected from the group consisting of metal salt of carboxylic acid, polyhydric alcohol, amino alcohol, linear polyether, saccharide, and sugar alcohol; and a surface treating agent selected from the group consisting of sorbitan fatty acid ester, glycidyl ether of polyhydric alcohol, and silane coupling agent.

The water absorptive composition of the present invention described above exhibits excellent waterproofing properties, having sufficiently high water-absorbing or hygroscopic swelling ratio and speed. Therefore, the present water absorptive composition can be suitably used for various water-proofing purposes. For example, the water absorptive composition may be applied to a substrate such as a non-woven fabric, yarn or paper sheet, or any other sheet of film of a suitable material, to thereby form a water absorptive member having a water absorptive coating on the substrate. The substrate may be coated or impregnated with the composition prepared in a suitable form. The substrate and the coating of the water absorptive composition provide a water-proofing material.

For instance, the water absorptive member prepared from the present water absorptive composition may be suitably used as a water absorptive member for an optical fiber cable.

Therefore, the second object indicated above may be achieved according to another aspect of the present invention, which provides an optical fiber cable comprising: an elongated grooved member which has at least one groove formed in an outer surface thereof so as to extend in a longitudinal direction thereof; at least one optical fiber element accommodated in each groove of the grooved member; a water absorptive member covering the outer surface of the grooved member; and a cable jacket formed on the water absorptive member and providing an outer surface of the cable. The present optical fiber cable is characterized by the water absorptive member, which includes at least a water absorptive coating formed from the water absorptive composition described above. That is, the water absorptive composition comprises a thermoplastic elastomer as a first component, a water-absorptive resin as a second component, and a third component which is selected from the group consisting of: a water-soluble resin; a hydrophilic compound selected from the group consisting of metal salt of carboxylic acid, polyhydric alcohol, amino alcohol, linear polyether, saccharide, and sugar alcohol; and a surface treating agent selected from the group consisting of sorbitan fatty acid ester, glycidyl ether of polyhydric alcohol, and silane coupling agent.

In the optical fiber cable of the present invention constructed as described above, the water absorptive member having the composition comprising the first, second and third components described above absorbs water entered into the cable through the cable jacket due to crazing of the jacket, for example, as soon as the water absorptive composition is exposed to the water. The water absorptive member permits not only fast absorption of the water between the grooved member and the cable jacket, but also fast and sufficient hygroscopic swelling or expansion into the groove of the grooved member, when exposed to the water within the groove. Thus, the water absorptive member used in the present optical fiber cable is capable of minimizing the water running distance in the groove, thereby effectively protecting the optical fiber element from exposure to the water, without using the water absorptive tapes 5 as shown in FIGS. 8 and 9. The water absorptive composition of the water absorptive member has high hygroscopic swelling speed and ratio, with respect to sea water, as well as to pure or fresh water.

The water absorptive composition according to the present invention may be used to form water absorptive yarns which may be used in the optical fiber cable of FIG. 7, in place of the water absorptive spun yarns 14. In this case, too, the water absorptive composition assures improved water-proofing capability of the cable.

DETAILED DESCRIPTION OF THE INVENTION

The thermoplastic elastomer used as the first component of the water absorptive composition is preferably selected from the group consisting of: ethylene-propylene rubber (EPDM); chloroprene rubber (CR); styrene-butadiene rubber (SBR) isobutylene-isoprene rubber (IIR); natural rubber (NR); styrene-butadiene block copolymer (SBS); styrene-isoprene block copolymer (SIS); and ethylene-vinyl acetate copolymer (EVA). The thermoplastic elastomer may consist of either one or a plurality of the members selected from the group indicated above.

The water-absorptive resin used as the second component together with the first component is preferably selected from the group consisting of: a cross-linked sodium polyacrylate; cross-linked sodium methacrylate; cross-linked polyethylene oxide; cross-linked carboxymethyl cellulose sodium salt; sodium acrylate-grafted starch; acrylonitrile-grafted starch; cellulose-sodium polyacrylate; copolymer of vinyl alcohol sodium acrylate and acrylic acid; copolymer of vinyl alcohol, sodium methacrylat(a and acrylic acid; copolymer of vinyl alcohol, sodium acrylate and methacrylic acid; and copolymer of vinyl alcohol, sodium methacrylate and methacrylic acid; alkali-neutralized cross-linked-copolymer of isobutylene and maleic acid anhydride; and polyurethane containing polyoxyethylene chain. Like the first component, the water-absorptive resin may consist of either one or a plurality of the members selected from the group indicated above.

Where the water-soluble resin is selected as the third component, the water absorptive composition may preferably comprise 100 parts by weight of the thermoplastic elastomer as first component, 10-3000 parts by weight of the water-absorptive resin as the second component, and 5-100 parts by weight of the water-soluble resin. The effect of the water absorptive composition decreases as the content of each component deviates from the specified range.

The water-soluble resin is effective to improve the hygroscopic swelling ratio and speed of the water absorptive composition, with respect to sea water or other waters which contain inorganic ions. More particularly, the water-soluble resin used as the third component is considered to give the water absorptive composition a hydrophilic property, in spite of the inherently hydrophobic property of the thermoplastic elastomer (first component). Thus, the water-soluble resin is considered to contribute to full utilization of the water absorbing property of the water-absorptive resin (second component).

The water-soluble resin as the third component is preferably selected from the group consisting of: sodium polyacrylate; polyethylene glycol; polyacrylamide; polyvinyl alcohol; water-soluble nylon; polyethyleneimine; polyvinyl pyrrolidone; and copolymer of vinyl pyrrolidone and vinyl acetate. The water-soluble resin may consist of either one or a plurality of the members selected from the group indicated above.

Where the water-soluble resin is selected as the third component, the water absorptive composition of the water absorptive member may further comprise up to 50 parts by weight of a surfactant as a fourth component. The use of this surfactant together with the water-soluble resin provides a further improvement in the hygroscopic swelling properties of the water absorptive composition. The water surfactant preferably consists of at least one sorbitan fatty acid ester selected from the group consisting of sorbitan monostearate, sorbitan monooleate, and sorbitan monolaurate. While a surfactant other than sorbitan fatty acid ester may be used with the sorbitan fatty acid ester, the use of the latter is desirable for improved hygroscopic swelling properties of the composition.

Where the hydrophilic compound is used as the third component of the water absorptive composition, the composition may preferably comprise 100 parts by weight of the first component, 10-3000 parts by weight of the second component, and 1-50 parts by weight of the hydrophilic component. The content of each component is desirably held within the specified range, since the deviation of the content from the specified range will accordingly reduce the effect of the water absorptive composition.

Like the water-soluble resin, the hydrophilic compound is effective to improve the hygroscopic swelling ratio and speed of the water absorptive composition, with respect to sea water or other waters which contain inorganic ions. Namely, the hydrophilic compound is considered to give the water absorptive composition a hydrophilic property, in spite of the hydrophobic property of the thermoplastic elastomer, thereby permitting full utilization of the water absorbing property of the water-absorptive resin.

While the hydrophilic compound is selected from the group consisting of metal salt of carboxylic acid, polyhydric alcohol, amino alcohol, linear polyether, saccharide and sugar alcohol, at least one of the following compounds are typically desirably used as the hydrophilic compound (third component): p0 a) Metal salt of carboxylic acid sodium acetate; sodium propionate; and sodium stearate b) Polyhydric alcohol diethylene glycol; triethylene glycol; polyethylene glycol; glycerin; polyglycerin; propylene glycol; diethanolamine; triethanolamine; and pentaerythritol.

c) Amino alcohol diethanolamine; and triethanolamine d) Linear polyether polyoxypropylene; and oxyethylene-oxypropylene block copolymer e) Saccharide glucose; and cane sugar f) Sugar alcohol sorbitol; sorbitan; mannitol; and mannitan Where the surface treating agent is selected as the third component of the water absorptive composition, the composition may preferably comprise 100 parts by weight of the thermoplastic elastomer as the first component, 10-3000 parts by weight of the water-absorptive resin as the second component, and 0.1-20 parts by weight of the surface treating agent. The surface treating agent consists of at least one material selected from the group consisting of sorbitan fatty acid, glycidyl ether of polyhydric alcohol, and a silane coupling agent.

Usually, the water-absorptive resin used as the second component is used in the form of powder and tends to have poor mixing uniformity (poor distribution) or local agglomerates when the water-absorptive resin powder is mixed and kneaded with the thermoplastic elastomer powder used as the first component. This poor distribution of the water-absorptive resin tends to reduce the swelling ratio and speed of the water absorptive composition. The surface treating agent used as the third component is added to assure even distribution of the water-absorptive resin powder. More specifically, the surface treating agent functions to treat the surface of the water-absorptive resin particles, permitting even or uniform distribution of the water-absorptive resin particles with respect to the thermoplastic elastomer powder, thereby improving the hygroscopic swelling properties of the water absorptive composition.

The following substances may be preferably used as the surface treating agent:

a) Sorbitan fatty acid sorbitan monostearate; sorbitan monooleate; and sorbitan monolaurate b) Glycidyl ether of polyhydric alcohol trimethylolpropane diglycidyl ether; glycerol diglycidyl ether; glycerol polyglycidyl ether; sorbitol diglycidyl ether; sorbitol polyglycidyl ether; and sorbitol tetraglycidyl ether c) Silane coupling agent vinyl polymethoxysilane; vinyl polyethoxysilane; γ-methacryloxy propyl trimethoxysilane; and vinyl triacetoxysilane

BRIEF DESCRIPTION OF THE DRAWINGS

The above and other objects, features and advantages of the present invention will be better understood from the following description of some presently preferred embodiments and examples of the invention, when considered in connection with the accompanying drawings, in which:

FIG. 5 is a fragmentary perspective view showing a device for testing the water absorptive member of FIG. 3 for its water absorbing capability;

FIG. 6 is a fragmentary perspective view showing a device for testing the water absorptive yarn of FIG. 4 for its water absorbing capability;

FIG. 7 is a transverse cross sectional view of a known optical fiber cable;

DESCRIPTION OF THE PREFERRED EMBODIMENTS

A water absorptive member as used for an optical fiber may be fabricated in the following manner:

Where the water absorptive composition includes the water-soluble resin and the surfactant as the third and fourth components, for example, in addition to the first and second components, all of these four components are evenly mixed in a suitable proportion within the range specified above, by using a suitable mixer or kneader. The thus obtained mixture is dissolved and dispersed in a solvent, to prepare a solution. The total concentration of the four components is usually held within a range of 10-50% by weight. The thus prepared solution is applied to a suitable substrate such as a nonwoven fabric or a yarn or paper sheet or film.

A solution of the water absorptive composition may be prepared in the same manner as described above, where the composition includes the hydrophilic compound as the third component in addition to the first and second components.

In the case where the surface treating agent is used as the third component in addition to the first and second components, a powder of the water-absorptive resin used as the second component is dried at 105° C. for 24 hours. The dried power is introduced into a stirrer/mixer, in the presence of a dry inert atmosphere. Then, a solution of the selected surface treating agent (prepared by using a suitable solvent such as alcohol or water) is introduced into the stirrer/mixer. The solution (third component) and the resin powder (second component) are stirred for 10-20 minutes. The obtained mixture is taken out of the stirrer/mixer, and the solvent is removed. The water-absorptive resin treated by the surface treating agent is then mixed and kneaded with a powder of the selected thermoplastic elastomer (first component), by using a suitable mixer or kneader, and the obtained powder mixture is dissolved and dispersed in a suitable solvent, to prepare a solution of the desired water absorptive composition. The concentration of the composition is held within a range of 10-50% by weight.

Figure 1:
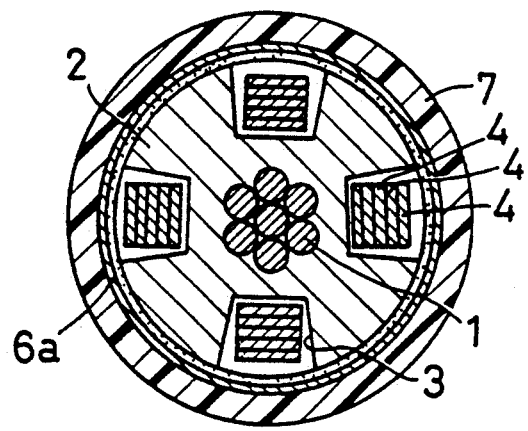
FIG. 1 is a transverse cross sectional view of one embodiment of an optical fiber cable of the present invention.
Figure 8:
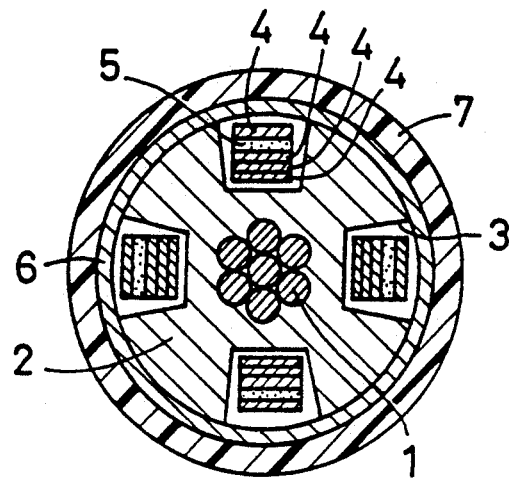
FIG. 8 is a transverse cross sectional view of a known optical fiber cable of another type.
Figure 9:
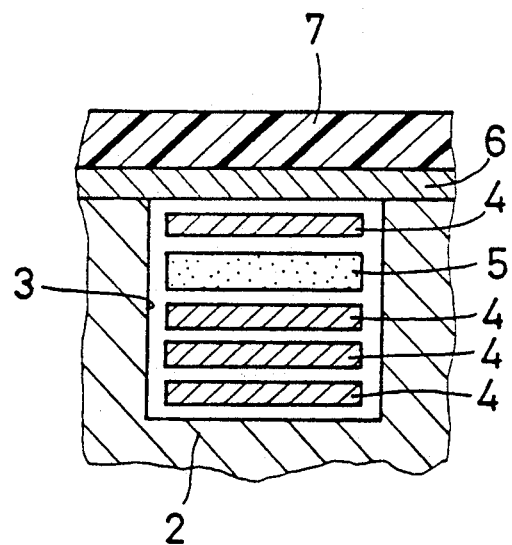
FIG. 9 is a fragmentary enlaged view in cross section showing a portion of the known optical fiber cable of FIG. 8.

An optical fiber cable using a water absorptive member using the water absorptive composition which has been described above is illustrated in FIGS. 1 and 2, wherein reference numeral 6a indicates a water absorptive member, which is provided between the grooved member 2 and the cable jacket 7. The optical fiber cable of FIG. 1 is different from the known cable of FIGS. 8 and 9 in that the water absorptive member 6a is different from the water absorptive layer 6 of the known cable, and in that the cable of FIGS. 1 and 2 does not use a water absorptive tape as indicated at 5 in FIGS. 6 and 7. As shown in FIG. 3, the water absorptive member 6a consists of a substrate 22, and a water absorptive coating 21 which is formed of the water absorptive composition described above. According to the arrangement of FIGS. 1 and 2, each stack of optical fiber tapes 4 accommodated in each groove 3 does not incorporate the water absorptive tape as provided in the known cable of FIGS. 8 and 9, whereby the present cable is simpler in construction and more economical to manufacture, than the known cable. Further, the water absorptive coating 21 hygroscopically swells upon exposure to water entered through the cable jacket 7 due to crazing thereof, for example, thereby absorbing the water between the cable jacket 7 and the grooved member 2, and the sea water entered into the grooves 3. Thus, the water absorptive coating 21 effectively protects the optical fiber tapes 4 against exposure to the water within the grooves. Since the hygroscopic swelling properties of the water absorptive coating 21 are effective with respect to sea water as well as pure or fresh water, the present optical fiber cable can be suitably used as submarine cables.

Figure 4:
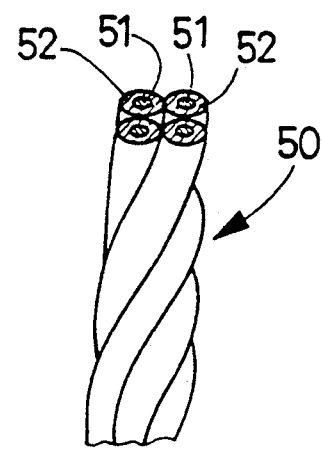
FIG. 4 is a fragmentary perspective view of a water absorptive yarn used in another embodiment of the invention.

The water absorptive composition may be used to prepare water absorptive yarns 50 as shown in FIG. 4, which are used in place of the water absorptive spun yarns 14 used in the known cable of the type shown in FIG. 7.

To further clarify the present invention, there will be described some examples of the present invention, together with comparative examples.

EXAMPLES

Example 1

The first through fourth components A-D as indicated in Table 1 were mixed in proportions (parts by weight) indicated in the same table, and individual mixtures were kneaded by rolls, to prepare eight specimens of water absorptive compositions according to the present invention, and three comparative specimens. In the present Example, water-soluble resins and a surfactant were used as the third and fourth components C and D, respectively.

Each specimen of the water absorptive composition was dissolved in toluene, to prepare a corresponding solution having a 30% concentration of the water absorptive composition. A water absorptive member 6a as shown in FIG. 3 was prepared, by applying the solution to one surface of a substrate in the form of a non-woven fabric 22 having a thickness of 0.1-0.3 mm. As a result, a water absorptive coating having a thickness of 0.05-0.3 mm was formed on the substrate 22.

By using the solutions prepared as described above, water absorptive yarns 50 as shown in FIG. 4 were produced by forming water absorptive coatings 52 on four polyester fibers 51 (each having a thickness of 1000 denier). The coatings 52 were formed from each specimen of the water absorptive solutions. The four coated fibers 51, 52 were twisted to obtain each yarn 50.

The prepared water absorptive members 6a were tested to measure the ratios of hygroscopic swelling or expansion 10 minutes and 24 hours after the exposure to water. The ratios were obtained based on a difference in the weight of the specimens before and after the test. Based on the measured swelling ratios and the appearance of the members 6a after the water exposure, the water absorptive member 6a according to each specimen was evaluated in terms of the water absorbing or swelling capability with respect to pure water and sea water. The results of the evaluation

TABLE 1

| Specimen No. | | | Comparative Specimens | | | Specimens According to the Invention | | | | | | | |
|---|---|---|---|---|---|---|---|---|---|---|---|---|---|
| | | | 1 | 2 | 3 | 1 | 2 | 3 | 4 | 5 | 6 | 7 | 8 |
| Composition | A | EPDM | — | — | — | — | — | — | 100 | — | — | — | 100 |
| | *1 | SBS | 100 | 100 | 100 | 100 | 100 | 100 | — | 100 | 100 | 100 | — |
| | B | Cross-linked sodium polyacrylate | 200 | 300 | 200 | 200 | 200 | 200 | 2000 | 200 | 200 | 200 | 200 |
| | *1 | | | | | | | | | | | | |
| | C | Polyvinyl alcohol | — | — | 2 | 5 | 50 | 100 | — | 50 | 50 | 50 | 50 |
| | *1 | Polyethylene glycol | — | — | — | — | — | — | 50 | — | — | — | — |
| | D | Sorbitan monostearate*1 | — | — | — | — | — | — | — | 0.1 | 10 | 50 | 50 |
| Ratio of 10-min. swelling | | | 11 | 18 | 20 | 27 | 32 | 45 | 43 | 35 | 47 | 52 | 55 |
| Ratio of 24-hr. swelling | | | 80 | 95 | 85 | 85 | 87 | 90 | 89 | 92 | 90 | 90 | 92 |
| Pure water swelling capability | | | P | P-SP | SP | G | G-E | E | E | G-E | E | E | E |

TABLE 1-continued

| Specimen No. | Comparative Specimens | | | Specimens According to the Invention | | | | | | | |
|---|---|---|---|---|---|---|---|---|---|---|---|
| | 1 | 2 | 3 | 1 | 2 | 3 | 4 | 5 | 6 | 7 | 8 |
| Sea water swelling capability | P | P | P | SP | G | G | E | G | G | G | E |

*[1] Parts by weight
P: Poor
SP: Slightly poor
G: Good
E: Excellent are also indicated in Table 1. Similar results were obtained with respect to the water absorptive yarns 50.

The water absorptive members 6a and water absorptive yarns 50 were also teared for their water absorbing capabilities with respect to pure water and sea water, by using measuring devices as shown in FIGS. 5 and 6. The device for testing the water absorptive members 6a includes a rail 31 having a groove 30 formed along its length, and a reservoir pipe 32 which communicates with one end of the groove 30. Each test specimen of the water absorptive member 6a was attached to the rail 31 such that the water absorptive coating 21 covers the elongate opening of the groove 30, so as to define an elongate water flow channel. In testing each water absorptive member 6a, a column of pure water having a height of 1 m was stored in the reservoir pipe 32, and a shut-off valve connected to the reservoir 32 was opened to allow the pure water to flow into the channel defined by the rail 31 and the water absorptive coating 21. The length of the channel over which the water run was measured for each specimen of the water absorptive member 6a. The shorter the measured length, the better the water absorbing capability (hygroscopic swelling property) of the water absorptive member 6a. Similar measurement was made by using sea water. The measured values are indicated in Table 2.

The device for testing the water absorptive yarns 50 includes a horizontal glass tube 60, and a vertical reservoir 62 formed integrally with the glass tube 60 such that the reservoir 62 communicates with the glass tube 60 through a shut-off valve 61 disposed at one end of the glass tube 60. Each water absorptive yarn 50 to be tested is inserted into the glass tube 60, and a column of water (pure water and sea water) was stored in the reservoir 62. The shut-off valve 61 was opened to allow the water to flow into the glass tube 60. The length of the water run in the tube 60 was measured for each specimen, for pure water and sea water. The measurements are also indicated in Table 2.

Example 2

The first and second components A and B, and hydrophilic compounds as the third component C were mixed in proportions (parts by weight) indicated in Table 3, to prepare thirteen specimens of water absorptive compositions according to the present invention, and two comparative specimens. In the same manner as in Example 1, water absorptive members 6a and yarns 50 were prepared from the prepared compositions, and were subjected to the same tests and evaluations as in Example 1. The results of the tests and evaluations are indicated in Tables 3 and 4 which correspond to Tables 1 and 2.

TABLE 2

| Specimen No. | Comparative Specimens | | | Specimens According to the Invention | | | | | | |
|---|---|---|---|---|---|---|---|---|---|---|
| | 1 | 2 | 3 | 1 | 2 | 3 | 4 | 5 | 6 | 7 |
| Water absorptive members 6a | | | | | | | | | | |
| Sea water run (cm) | 500 | 430 | 410 | 430 | 200 | 140 | 180 | 150 | 135 | 143 |
| Pure water run (cm) | 120 | 100 | 95 | 95 | 50 | 35 | 40 | 35 | 30 | 30 |
| Water absorptive yarns 50 | | | | | | | | | | |
| Sea water run (cm) | 500 | 450 | 460 | 400 | 280 | 200 | 220 | 190 | 195 | 170 |
| Pure water run (cm) | 200 | 180 | 180 | 160 | 120 | 100 | 105 | 95 | 80 | 85 |

TABLE 3

| Specimen No. | | | Comparative Specimens | | Specimens According to the Invention | | | | | | | | | | | |
|---|---|---|---|---|---|---|---|---|---|---|---|---|---|---|---|---|
| | | | 1 | 2 | 1 | 2 | 3 | 4 | 5 | 6 | 7 | 8 | 9 | 10 | 11 | 12 | 13 |
| Com- | A | EPDM*[1] | 100 | 100 | 100 | 100 | 100 | 100 | 100 | 100 | 100 | 100 | 100 | 100 | 100 | 100 | 100 |
| posi- | B | Cross-linked sodium polyacrylate | 200 | 300 | 200 | 200 | 200 | 200 | 200 | 200 | 200 | 200 | 200 | 200 | 500 | 1000 | 1500 |
| tion | *[1] | Cross-linked acrylic acid-sodium acrylate copolymer | — | — | 200 | 200 | 200 | 200 | 200 | 200 | 200 | 200 | 200 | 200 | 500 | 1000 | 1500 |
| | C | Sodium propionate | — | — | 5 | 10 | 5 | 5 | 10 | 10 | 10 | 20 | — | — | 5 | 5 | 5 |
| | *[1] | Polypropylene glycol | — | — | — | — | 5 | 10 | 5 | 10 | — | — | 10 | 20 | 10 | 10 | 10 |
| Ratio of 10-min. swelling | | | 11 | 18 | 20 | 23 | 30 | 32 | 32 | 35 | 25 | 38 | 21 | 33 | 52 | 65 | 70 |
| Ratio of 24-hr. swelling | | | 80 | 95 | 85 | 90 | 100 | 105 | 105 | 105 | 83 | 81 | 80 | 80 | 180 | 210 | 270 |
| Pure wate swelling capability | | | P | P-SP | G | G | G-E | E | E | E | G | G | G | G | E | E | E |

TABLE 3-continued

| Specimen No. | Comparative Specimens | | Specimens According to the Invention | | | | | | | | | | | | |
|---|---|---|---|---|---|---|---|---|---|---|---|---|---|---|---|
| | 1 | 2 | 1 | 2 | 3 | 4 | 5 | 6 | 7 | 8 | 9 | 10 | 11 | 12 | 13 |
| Sea water swelling capability | P | P | SP | G | SP-G | G | G | G | G | G | G | G | E | E | E |

*[1] Parts by weight
P: Poor
SP: Slightly poor
G: Good
E: Excellent

TABLE 4

| Specimen No. | Comparative Specimens | | Specimens According to the Invention | | | | | | | | | | | | |
|---|---|---|---|---|---|---|---|---|---|---|---|---|---|---|---|
| | 1 | 2 | 1 | 2 | 3 | 4 | 5 | 6 | 7 | 8 | 9 | 10 | 11 | 12 | 13 |
| Water absorptive members 6a | | | | | | | | | | | | | | | |
| Sea water run (cm) | 500 | 500 | 500 | 385 | 370 | 310 | 285 | 135 | 370 | 360 | 410 | 420 | 110 | 100 | 95 |
| Pure water run (cm) | 100 | 100 | 100 | 70 | 28 | 20 | 19 | 11 | 30 | 10 | 65 | 70 | 10 | 9 | 7 |
| Water absorptive yarns 50 | | | | | | | | | | | | | | | |
| Sea water run (cm) | 500 | 500 | 500 | 430 | 370 | 350 | 335 | 255 | 290 | 230 | 240 | 220 | 150 | 140 | 125 |
| Pure water run (cm) | 150 | 150 | 150 | 130 | 95 | 80 | 80 | 65 | 70 | 55 | 50 | 52 | 20 | 17 | 15 |

Example 3

The first and second components A and B, and surface treating agents as the third component C were mixed in proportions (parts by weight) indicated in Table 5, to prepare five specimens of water absorptive compositions according to the present invention, and two comparative specimens. In the same manner as in Examples 1 and 2, water absorptive members 6a and yarns 50 were obtained from the prepared compositions, and were subjected to the tests to measure the swelling ratios, evaluate the water absorbing capability with respect to pure water only, and observe the mixing uniformity of the water-absorptive resin powder (component B) with respect to the thermoplastic elastomer (first component A), and the presence of local agglomerates of the water-absorptive resin powder in its mixture with the thermoplastic elastomer powder. The results of the tests and evaluations are indicated in Tables 5 and 6 which correspond to Tables 1 and 2.

TABLE 5

| Specimen No. | | | Comparative Specimens | | Specimens According to the Invention | | | | |
|---|---|---|---|---|---|---|---|---|---|
| | | | 1 | 2 | 1 | 2 | 3 | 4 | 5 |
| Composition | A | EPDM*[1] | 100 | 100 | 100 | 100 | 100 | 100 | 100 |
| | B | Cross-linked sodium polyacrylate *[1] | 200 | 300 | 200 | 200 | 200 | 200 | 200 |
| | C | Trimethylopropane diglycidyl ether *[1] | — | — | 0.1 | 2 | — | — | — |
| | | vinyl methoxysilane | — | — | — | — | — | — | 20 |
| Local agglomerates of B | | | Yes | Yes | No | No | No | No | No |
| Mixing uniformity of B | | | SP | P | SP-G | G | E | E | E |
| Ratio of 10-min. swelling | | | 11 | 18 | 20 | 27 | 40 | 42 | 42 |
| Ratio of 24-hr. swelling | | | 80 | 95 | 80 | 82 | 83 | 83 | 82 |
| Pure water swelling capability | | | P | P-SP | SP | G | E | E | E |

*[1] Parts by weight
P: Poor
SP: Slightly poor
G: Good
E: Excellent

TABLE 6

| Specimen No. | Comparative Specimens | | Specimens According to the Invention | | | | |
|---|---|---|---|---|---|---|---|
| | 1 | 2 | 1 | 2 | 3 | 4 | 5 |
| Water absorptive members | | | | | | | |
| Sea water run (cm) | 500 | 500 | 453 | 373 | 310 | 295 | 305 |
| Pure water run (cm) | 100 | 120 | 70 | 65 | 35 | 40 | 45 |
| Water absorptive yarns | | | | | | | |
| Sea water run (cm) | 500 | 500 | 500 | 450 | 405 | 355 | 340 |
| Pure water run (cm) | 150 | 150 | 130 | 115 | 95 | 80 | 75 |

Figure 2:
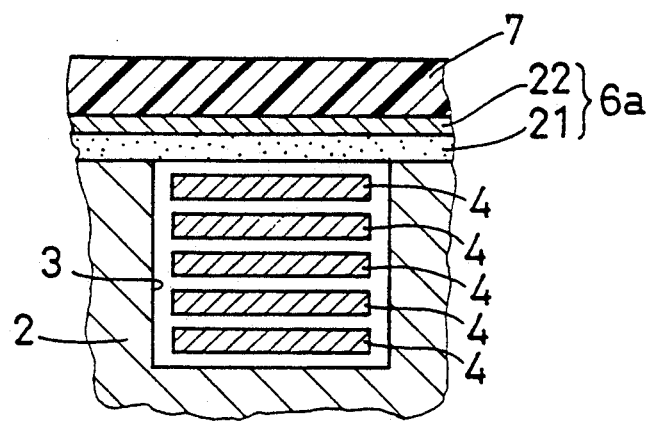
FIG. 2 is a fragmentary enlarged view in cross section of a portion of the optical fiber cable of FIG. 1.
Figure 3:
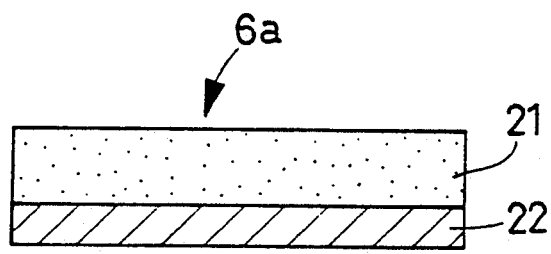
FIG. 3 is a cross sectional view of a water absorptive member provided in the optical fiber cable of FIG. 1.

Optical fiber cables as shown in FIGS. 1-3 were produced using the water absorptive members 6a of the present invention prepared according to the specimen Nos. 2 and 6 of Examples 1 and 2, and according to the specimen Nos. 1 and 5 of Example 3. The cable jacket 7 was purposely crazed, and the cables were submerged in sea water, to measure the length of the water run through the grooves 3. The measured values are close to those indicated in Tables 2, 4 and 6.

It will be understood from the foregoing description that the water absorptive composition according to this invention has sufficiently high ratio and speed of hygroscopic swelling or expansion, and can be suitably used as a water absorptive member such as the water absorptive member 6a or yarn 50 as shown in FIGS. 2-4 for optical fiber cables. The optical fiber cable of FIGS. 1-3 which uses the water absorptive member 6a of the invention does not require the additional water absorptive tapes 5 used in the grooves 3 of the conventional cable of FIGS. 8 and 9. Accordingly, the use of the water absorptive member 6a makes the optical fiber cable simple in construction, and economical to manufacture. The test results of Examples 1-3 indicate that the water absorptive yarns 50 can be advantageously used in place of the water absorptive spun yarns 14 used in the conventional cable of FIG. 7. The test results also indicate that the water absorptive members formed from the water absorptive composition according to the present invention exhibit significant improvement in water absorbing or swelling capability (swelling ratio and speed), over the conventional water absorptive members (comparative specimens), with respect to sea water as well as pure or fresh water. Thus, the optical fiber cable using the water absorptive member according to the present invention can be suitably used as submarine optical fiber cables having excellent water-proofing properties.

While the present invention has been described above in its presently preferred formed, it is to be understood that the invention is not limited to the details of the illustrated examples of the invention, but may be embodied with various changes, modifications and improvements, which may occur to those skilled in the art, without departing from the spirit and scope of the invention defined in the following claims.

What is claimed is:

1. A water absorptive composition comprising a thermoplastic elastomer as a first component, a water-absorptive resin as a second component, and a third component selected from the group which consists of: a hydrophilic compound selected from the group consisting of metal salt of carboxylic acid, polyhydric alcohol, amino alcohol, linear polyether, saccharide, and sugar alcohol; and a surface treating agent selected from the group consisting of sorbitan fatty acid ester, glycidyl ether of polyhydric alcohol, and silane coupling agent.

2. A water absorptive composition according to claim 1, wherein said thermoplastic elastomer as a first component is selected from the group consisting of: ethylene-propylene rubber (EPDM); chloroprene rubber (CR); styrene-butadiene rubber (SBR), isobutylene-isoprene rubber (IIR); natural rubber (NR); styrene-butadiene block copolymer (SBS); styrene-isoprene block copolymer (SIS); and ethylene-vinyl acetate copolymer (EVA).

3. A water absorptive composition according to claim 1, wherein said water-absorptive resin as a second component is selected from the group consisting of: a cross-linked sodium polyacrylate; cross-linked sodium methacrylate; cross-linked polyethylene oxide; cross-linked carboxymethyl cellulose sodium salt; sodium acrylate-grafted starch; acrylonitrile-grafted starch; cellulose-sodium polyacrylate; copolymer of vinyl alcohol sodium acrylate and acrylic acid; copolymer of vinyl alcohol, sodium methacrylate and acrylic acid; copolymer of vinyl alcohol, sodium acrylate and methacrylic acid; and copolymer of vinyl alcohol, sodium methacrylate and methacrylic acid; alkali-neutralized cross-linked copolymer of isobutylene and maleic acid anhydride; and polyurethane containing polyoxyethylene chain.

4. A water absorptive composition according to claim 1, wherein said water absorptive composition comprises 100 parts by weight of said first component, 10-3000 parts by weight of said second component, and 1-50 parts by weight of said hydrophilic compound as said third component, said hydrophilic compound being selected from the group consisting of metal salt of carboxylic acid, polyhydric alcohol, amino alcohol, linear polyether, saccharide, and sugar alcohol.

5. A water absorptive composition according to claim 4, wherein said metal salt of carboxylic acid is selected from the group consisting of: sodium acetate; sodium propionate; and sodium stearate.

6. A water absorptive composition according to claim 4, wherein said polyhydric alcohol is selected from the group consisting of: diethylene glycol; triethylene glycol; polyethylene glycol; glycerin; polyglycerin; propylene glycol; and pentaerythritol.

7. A water absorptive composition according to claim 4, wherein said amino alcohol is selected from the group consisting of diethanolamine, and triethanolamine.

8. A water absorptive composition according to claim 4, wherein said linear polyether is selected from the group consisting of polyoxypropylene, and oxyethylene-oxypropylene block copolymer.

9. A water absorptive composition according to claim 4, wherein said saccharide is selected from the group consisting of glucose and cane sugar.

10. A water absorptive composition according to claim 4, wherein said sugar alcohol is selected from the group consisting of: sorbitol; sorbitan; mannitol; and mannitan.

11. A water absorptive composition according to claim 1, wherein said water absorptive composition comprises 100 parts by weight of said first component, 10-3000 parts by weight of said second component, and 0.1-20 parts by weight of said surface treating agent as said third component, said surface treating agent being selected from the group consisting of sorbitan fatty acid ester, glycidyl ether of polyhydric alcohol, and silane coupling agent.

12. A water absorptive composition according to claim 11, wherein said sorbitan fatty acid is selected from the group consisting of: sorbitan monostearate; sorbitan monooleate; and sorbitan monolaurate.

13. A water absorptive composition according to claim 11, wherein said glycidyl ether of polyhydric alcohol is selected from the group consisting of: trimethylolpropane diglycidyl ether; glycerol diglycidyl ether; glycerol polyglycidyl ether; sorbitol diglycidyl ether; sorbitol polyglycidyl ether; and sorbitol tetraglycidyl ether.

14. A water absorptive composition according to claim 11, wherein said silane coupling agent is selected from the group consisting of: vinyl polymethoxysilane; vinyl polyethoxysilane; γ-methacryloxy propyl trimethoxysilane; and vinyl triacetoxysilane.

15. A water absorptive member consisting of a substrate, and a water absorptive coating which is formed on one surface of said substrate and which consists of a water absorptive composition as claimed in claim 1.

* * * * *